United States Patent [19]

Kudoh et al.

[11] Patent Number: 5,895,606

[45] Date of Patent: *Apr. 20, 1999

[54] CONDUCTIVE POLYMER COMPOSITION COMPRISING POLYPYRROLE AND COMPOSITE DOPANT

[75] Inventors: Yasuo Kudoh, Yokohama; Toshikuni Kojima, Kawasaki; Kenji Akami, Fujisawa, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,645

[22] Filed: Feb. 16, 1996

[30] Foreign Application Priority Data

Feb. 17, 1995 [JP] Japan ................................. 7-029431
Jun. 26, 1995 [JP] Japan ................................. 7-159001

[51] Int. Cl.$^6$ .................................................. H01B 1/12
[52] U.S. Cl. ................................................ 252/500; 528/210
[58] Field of Search ............................ 252/500, 518, 252/521, 519.4, 521.5; 528/210, 422

[56] References Cited

U.S. PATENT DOCUMENTS

| | | | |
|---|---|---|---|
| 4,536,262 | 8/1985 | Wegner et al. | 204/56 R |
| 5,066,731 | 11/1991 | Feldhues et al. | 525/417 |
| 5,281,363 | 1/1994 | Shacklette et al. | 252/500 |
| 5,304,335 | 4/1994 | Sagnes et al. | 252/500 |
| 5,378,404 | 1/1995 | Han et al. | 252/500 |

FOREIGN PATENT DOCUMENTS

| | | |
|---|---|---|
| 0129070A2 | 5/1984 | European Pat. Off. |
| 0313998A2 | 10/1988 | European Pat. Off. |
| 0424048A2 | 10/1990 | European Pat. Off. |
| 0500417A1 | 8/1992 | European Pat. Off. |
| 2130906 | 5/1990 | Japan |
| 393214 | 4/1991 | Japan |
| 5251078 | 9/1993 | Japan |

OTHER PUBLICATIONS

Abstract, "Solid electrolytic capacitor", JP 03 159 222 (Marcon Electronics Co. Lt.), Derwent Publications Ltd., London, Jul. 9, 1991 (2 pages).

Abstract, "Solid electrolytic capacitor preparation with no void generation", JP 04 053 115 (Japan Carlit KK), Derwent Publications Ltd., London, Feb. 1992.

Abstract, "Small, large capacity capacitor mfr.", JP 05 283 268 (Japan Carlit Co., Ltd.), Derwent Publications, Ltd., London, Oct. 29, 1993.

"Effective Doping of Polymer Anion during Chemical Polymerization of Pyrrole Using Fe(OH)$_3$ Oxidant" by A. Ohtani et al; 1989

The Chemical Society of Japan, vol. 62, No. 1; pp., 234–238. No Month.

*Primary Examiner*—Mark Kopec
*Attorney, Agent, or Firm*—McDermott, Will & Emery

[57] ABSTRACT

A conductive polymer composition comprises a conjugated double bond-bearing polymer and a composite dopant consisting essentially of an organic anion derived from an anionic surface active agent and an inorganic anion derived from a transition metal salt. A process for preparing the conductive polymer composition is also described wherein the polymerizable proceeds rapidly in coexistence of the organic anion and the inorganic anion. Addition of fine particle of an oxide is effective in film formation on substrates.

9 Claims, 2 Drawing Sheets

CONDUCTIVE POLYMER COMPOSITION COMPRISING POLYPYRROLE AND COMPOSITE DOPANT

BACKGROUND OF THE INVENTION

1. Field of The Invention

This invention relates to a conductive polymer composition which comprises a conjugated double bond-bearing polymer doped with anions derived from anionic surface active agents and inorganic transition metal salts. The invention also relates to a process for preparing the conductive polymer composition and a process for forming the composition in the form of a film.

2. Description of the Prior Art

In general, conjugated double bond-bearing conductive polymers, such as polyaniline, polypyrrole and polythiophene, have been prepared through chemical oxidation polymerization or electrolytic polymerization.

When using electrolytic polymerization, the resultant conductive polymer is formed on an electrode in the form of a film, and is thus difficult to prepare the polymer in large amounts. In contrast, the polymerization through chemical oxidation has no limitation with respect to the amount. That is to say conductive polymers can be obtained in large amounts relatively easily by reaction between a polymerizable monomer and an appropriate oxidant.

However, the conductive polymer obtained by the chemical oxidation polymerization is in the form of a powder or particles. This makes it difficult to uniformly cover solid surfaces with the polymer. Hence, attempts have been made to form a film by mixing the polymer with various types of binders or by rendering the polymer soluble in solvents by introduction of an appropriate substituent thereinto.

Usually, the chemical oxidation polymerization velocity depends greatly on the type of oxidant. If ammonium persulfate or hydrogen peroxide which can increase the polymerization velocity is employed, the resultant polymer is not high in electric conductivity and/or is poor in heat resistance. The reason for this is that such an oxidant as mentioned above is so highly active that undesirable side reactions frequently take place. This may result in the formation of polymers whose structural regularity is not high, or once formed polymer may be degraded owing to the attack with the oxidant.

In order to solve the above problems, oxidants which contain transition metal ions such as trivalent iron ions are frequently used. Although, the resultant polymer has a relatively great electric conductivity and good thermal stability, the polymerization velocity is so small that it takes a long time before completion of the polymerization. Accordingly, the resultant conjugated double bond-bearing polymer is resident for a long time in the reaction system. Under these conditions, the polymer is most liable to be attacked with the protons generated during the course of the polymerization reaction, coupled with the problem that the electric conductivity eventually lowers.

The conjugated double bond-bearing conductive polymers have a dopant of anions or cations taken in as a part thereof, with which inherent electric, optical and chemical characteristics develop. The thermal stability of the polymer tends to depend greatly on the type of dopant. The anion doping in the conjugated double bond-bearing polymer is now described in more detail.

In general, inorganic acid ions are so small in ion size that they are likely to diffuse. Especially, under high temperature and high humidity conditions, the inorganic acid ions taken in a polymer matrix are relatively readily de-doped from the polymer matrix, making it difficult to provide a conductive polymer which has good heat and humidity resistances.

In order that polyvalent anions, such as sulfate ions, are permitted to incorporate in a polymer matrix as a dopant, it is necessary that two bonding sites which are positioned closely to each other, are provided within a polymer chain or between adjacent polymer chains. In addition, where the polyvalent ions are incorporated in the matrix as a dopant, they are extremely sterically crowded owing to the small ion size. This results in the polymer structure being strained, thus leading to lower electric conductivity than expected.

On the other hand, when organic anions having a bulky structure are used, little or no strain is not exerted on the polymer structure. Such bulky organic anions are not prone to diffusion on the application of heat. Thus, the resultant conjugated double bond-bearing polymers have good electric characteristics and good heat and moisture resistances.

In fact, when anthraquinonesulfonate ions or alkylnaphthalenesulfonate ions are doped, the resultant polypyrrole has good heat and moisture resistances as set out in Japanese Laid-open Patent Publication Nos. 3-93214 and 2-130906. In these publications, the doped polypyrrole is prepared by electrolytic polymerization. In the electrolytic polymerization, transition metal salts are usually used. However, the salts containing such relatively large molecule anions are low in solubility in water. Accordingly, it has been difficult to directly incorporate the anion into a conjugated double bond-bearing polymer through chemical oxidation polymerization in an aqueous medium.

The conductive polymers obtained by chemical oxidation polymerization are ordinarily in the form of powder or particles. Since the polymer structure is formed of conjugated double bonds, it is, in most cases, difficult to process the powder or particles by thermal melting or dispersion in solvents.

For the purpose of film formation, attempts have been made wherein the conductive polymer powder is mixed with resin binders, or appropriate substituents are introduced into the main chain of the polymer to render the polymer soluble in solvents.

However, the mixing with binder resins or the introduction of substituents into the main chain of the polymer has the following problems.

In the former case, it is inevitable that the electric conductivity lowers owing to the dilution of the conductive polymer. In the latter case where the polymer is rendered soluble in solvents, limitation is placed on the selection of a substituent owing to the difficulty in balancing the solubility to be imparted and the inherent characteristics, e.g. electric conductivity and environmental stability, of the conductive polymer. Additionally, the preparation of a polymerizable monomer having an appropriate substituent which is effective in rendering the resultant polymer soluble in solvents is difficult. This eventually leads to high costs of the conductive polymer.

SUMMARY OF THE INVENTION

It is accordingly an object of the invention to provide a conductive polymer composition which comprises a conjugated double bond-bearing conductive polymer and exhibits high conductivity and high thermal stability.

It is another object of the invention to provide a process for readily preparing such a conductive polymer composition by chemical oxidation in high yield within a short time.

It is a further object of the invention to provide a process for preparing a conductive polymer composition in the form of a film on an appropriate substrate.

It is a still further object of the invention to provide a product obtained by the process mentioned above.

According to one embodiment of the invention, there is provided a conductive polymer composition which comprises a conjugated double bond-bearing polymer and a composite dopant consisting essentially of an anion derived from an anionic surface active agent and an inorganic anion derived from a transition metal salt. By this, high electric conductivity is imparted to the conductive polymer composition without sacrificing of other properties such as heat and moisture resistances.

According to another embodiment of the invention, there is also provided a process for preparing a conductive polymer composition which comprises polymerizing a polymerizable monomer capable of yielding a conjugated double bond-bearing polymer in an aqueous system comprising an oxidant made of a transition metal salt and an anionic surface active agent capable of releasing an organic anion so that the polymerizable monomer is polymerized through chemical oxidation and the resulting polymer comprises a composite dopant of an inorganic anion derived from the transition metal salt and the organic anion from the anionic surface active agent.

According to a further embodiment of the invention, there is provided a process for preparing a conductive polymer composition in the form of a film on a substrate, which process comprising providing a substrate to be coated with the conductive polymer composition, immersing the substrate alternately in a monomer aqueous solution comprising a polymerizable monomer capable yielding a conjugated double bond-bearing polymer, an anionic surface active agent, and an oxide powder, and in an aqueous solution of an oxidant made of a transition metal salt, and repeating the alternate immersion until a conductive polymer composition comprising the conjugated double bond-bearing polymer, the oxide powder, the anion derived from the anionic surface active agent, and the inorganic ions derived from the transition metal salt is formed on the substrate in the form of a uniform film.

As will be apparent from the above, the conductive polymer composition of the invention comprises, as a dopant, not only the anion derived from the transition metal inorganic salt, but also the organic anion derived from the anionic surface active agent. The amount of the organic anion can be arbitrarily controlled by controlling the amount of the anionic surface active agent in the reaction system. More particularly, if the anionic surface active agent is added in greater amounts, the organic anion is predominantly incorporated in the polymer matrix.

For instance, when a polypyrrole matrix is formed in combination with an inorganic anion alone, one mole of the anion is joined to per 3 to 4 pyrrole rings or units. The inorganic anion is so small in size that the steric arrangement is undesirably disturbed owing to the small size of the inorganic anion. In contrast, if organic anions having a relatively large size co-exist, they are unlikely to disturb the main chain of the polymer matrix. Because of this, the organic anions are more likely to be taken or incorporated in as a dopant than the inorganic anions.

The molar concentration of the dopant per recurring unit of the polymer being doped is constant. In this condition, if the molecular weight of the organic anion is greater than that of the inorganic anion, the resultant conductive polymer relatively increases in yield.

If an inorganic anion is doped in the polymer matrix, the electric conductivity does not become so high as will be described hereinafter. When the organic anion derived from the anionic surface active agent co-exists with the inorganic anion as a dopant, high electric conductivity is attained. This is believed to be the reason why the large molecular size of the organic anion has little influence on the skeletal structure of the conductive polymer when doped. Moreover, where the organic anion has a bulky aromatic ring, the de-doping through thermal diffusion can be effectively suppressed. The resultant conductive polymer becomes thermally stable.

In the process of the invention wherein an oxidant made of a transition metal salt and an anionic surface active agent are used in combination, the polymerization velocity is remarkably improved and the electric conductivity is stabilized irrespective of the temperature used during the polymerization process It should be noted that, in general, the electric conductivity of a double bond-bearing polymer depends greatly on the temperature used for the polymerization. The reason why the polymerization velocity increases over that of prior art is that when an anionic surface active agent having a hydrophobic moiety is used in coexistence of a transition metal salt, an insolubilized matter or metal salt is formed in the reaction system at least transiently. This insoluble metal salt of the surface active agent serves as sites for initiating the polymerization reaction, thereby causing the polymerization to proceed at high velocity.

According to the process for the preparing a conductive polymer composition wherein the inorganic anions derived from transition metal inorganic salts used to polymerize the polymerizable monomer are polyvalent in nature, the organic anion derived from the anionic surface active agent is more likely to incorporate at high selectivity as a dopant. Thus, the organic anion can be arbitrarily incorporated in the polymer matrix.

If fine particles of oxides are further added to the reaction system, a very thin film can be uniformly formed on a solid surface through orientation of the oxide particles.

DETAILED DESCRIPTION AND EMBODIMENTS OF THE INVENTION

Figure 1:
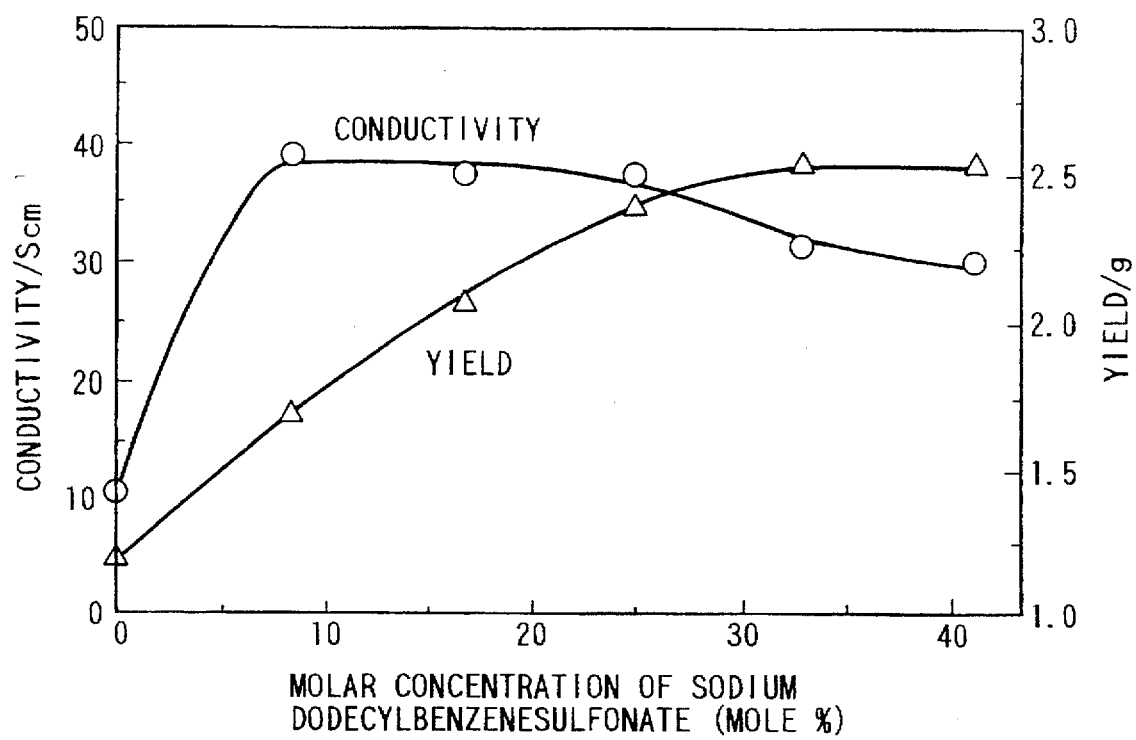
FIG. 1 is a schematic view showing the electric conductivity in relation to the variation in amount of NaDBS (sodium dodecylbenzenesulfonate) per unit pyrrole ring.

The conductive polymer composition is first described.

The composition comprises a conjugated double bond-bearing polymer matrix doped with a composite dopant containing an inorganic anion derived from a transition metal salt serving as an oxidant for the preparation of the composition, and an organic anion derived from an anionic surface active agent. The polymer matrix is obtained from a polymerizable monomer capable of yielding the conjugated double bond-bearing polymer matrix. Examples of the monomer include pyrrole, aniline and a mixture thereof although other monomers capable of yielding a conjugated double bond-bearing polymer may also be used. When pyrrole is used, the resultant conductive polymer composition exhibits an electric conductivity higher than that obtained using aniline. Nevertheless, the conductive polyaniline composition is better in thermal stability and costs than a conductive polypyrrole composition. Thus, these polymer compositions should be properly used depending on the purpose in end used.

The transition metal salts include, for example, copper salts, iron salts, cerium salts and chromium salts. More particularly, those salts of the metals mentioned above including sulfates, hydrochlorides, nitrates, perchiorates and hexacyanoferrate. Preferably, transition metals salts include ferric sulfate, ferric chloride, copper (II) sulfate and the like are used.

The inorganic anion is preferably present in the polymer composition in an amount of 3 to 20 mole % per monomer unit. Within this range, high electric conductivity is ensured without a sacrifice of other characteristic properties such as heat and moisture resistances.

The anionic surface active agents useful in the present invention which can provide the organic anion dopant in the polymer composition of the invention include, for example, metal carboxylates, sulfonates, esterified sulfates, esterified phosphates and mixtures thereof. Examples of the metal include sodium, potassium and the like which are capable of yielding watersoluble salts of organic compounds. Specific examples of the anionic surface active agents include sodium or potassium alkylsulfonates whose alkyl moiety has from 8 to 18 carbon atoms, sodium or potassium 2-ethylhexylsulfate, sodium or potassium polyethylene oxide alkylsulfates having 3 to 12 ethylene oxide units wherein the alkyl moiety has 8 to 18 carbon atoms, sodium or potassium 2-ethylhexylphosphate, sodium or potassium polyethylene oxide alkylphosphate, salts of potassium or sodium and coconut oil fatty acids, sodium or potassium triisopropylnaphthalenesulfonate, sodium or potassium alkylsulfates whose alkyl moiety has from 8 to 18 carbon atoms, and sodium or potassium dodecylbenzenesulfonate although other types of anionic surface active agents may also be used. It will be noted that the alkylsulfonates, alkylsulfates and polyethylene oxide alkylsulfates may, respectively, be in a mixed form wherein alkyl moieties have different carbon atoms within the above-defined ranges.

The organic anions derived from these agents should preferably be present in an amount of 3 to 25 mole %, more preferably from 5 to 21 mole %, per monomer unit.

The coexistence of the inorganic and organic anions leads to high electric conductivity of the resultant polymer composition along with good heat and humidity resistances.

Preferably, the conductive polymer composition should further comprise fine particles of oxides. By incorporating the fine particles of oxides, the composition can be conveniently formed as a thin film on the surfaces of metals such as stainless steels or other solid materials. For this purpose, the fine particles should preferably be made of silica, alumina, lithium silicate and the like. The particle size is preferably not greater than 100 nm, more preferably not greater than 50 nm.

These oxide fine particles can be readily obtained by vapor phase synthesis and can be commercially available, for example, under designations of Aerosil from Nippon Aerosil Corp., and Snowtex from Nissan Chemical Industries, Ltd. The fine particles which may be in the form of solid particles or in a colloidal dispersion in an appropriate solvent or water may be added to a monomer solution or directly to a chemical oxidation reaction system.

The fine particles are present in the composition in amounts of 0.1 to 5 wt % of the composition.

The process for preparing the conductive polymer composition is then described.

The composition is prepared by polymerizing a polymerizable monomer through chemical oxidation in an aqueous system comprising an oxidant made of a transition metal inorganic salt and an anionic surface active agent capable of releasing an organic anion. This polymerization reaction proceeds very rapidly by the action of the oxidant at room temperature although a higher temperature up to 50° C. may be used.

In practice, the inorganic salt is present in amounts of 0.01 to 5 moles/liter of the reaction system. The amount of the anionic surface active agent varies depending on the intended amount of the organic anion derived therefrom in a final polymer composition. More particularly, a higher amount of the anionic surface active agent in the reaction system results in a higher content thereof in the final polymer composition for the reason having set out hereinbefore.

The polymerizable monomer is preferably present at a concentration of 0.01 to 5 moles/liter of the reaction system. The reaction system should be aqueous although a lower alcohol such as methanol or ethanol may be added to the reaction system in an amount of 1 to 20 wt %.

For the reaction, the aqueous solution of an oxidant may be first prepared. The aqueous solution of a polymerizable monomer and an aqueous solution of an anionic surface active agent in water is separately prepared. This separately prepared solution may be added to the oxidant solution. Alternatively, all the components may be added to water for the reaction.

The reaction proceeds usually under agitation for 5 to 120 minutes.

The oxidant may further comprise, aside from a transition metal salt, ammonium persulfate. The use of ammonium persulfate permits the polymerization reaction to proceed more rapidly. If ,however, ammonium persulfate is used alone as an oxidant, the effects attained by the invention will not be expected. If use, the ammonium persulfate is added at a ratio, to the transition metal salt, by weight of 0.1 to 1:1.

In the process of the invention, the reaction system may further comprise fine particles of oxides as defined before. If the fine particles are used, they are preferably added to the aqueous solution comprising a polymerizable monomer. The fine particles are added in amounts sufficient to provide an oxide content as defined with respect to the conductive polymer composition.

If aniline is used as a starting monomer, a pH adjuster such as an acid may be used to adjust the pH of the reaction system to 0.1 to 1. Examples of the acid include mineral acids such as sulfuric acid, hydrochloric acid, phosphoric acid and the like.

The conductive polymer composition is ordinarily obtained in the form of powder. The powder may be shaped in any desired form by application of a compression pressure by a usual manner.

In this connection, if the fine particles of oxides are used, a thin film of a conductive polymer composition comprising the fine particles can be formed on a solid or metal surface. This is because the fine particles assist in filmforming the conductive polymer composition on a solid surface. For this purpose, it is preferred to separately prepare an aqueous solution of an oxidant and an aqueous solution of a polymerizable monomer, an anionic surface active agent and fine particles of an oxide. Preferably, a solid or metal substrate is immersed first in the monomer-containing solution, and then in the aqueous oxidant solution. This immersion cycle is repeated until a uniform conductive polymer film is formed over the substrate. In general, the substrate immersed in the monomer-containing solution is allowed to stand for 1 to 10 minutes to permit the reaction to proceed. Thereafter, the substrate is further immersed in the oxidant solution for 1 to 30 minutes, followed by repeating the immersion in the monomer-containing solution and then in the oxidant solution.

When the fine particles are added to the reaction system, the immersion cycles before the formation of a uniform film can be shortened significantly. More particularly, seven to eight cycles are sufficient to complete the film formation on a substrate. If no fine particles are added, ten and several immersion cycles are necessary for the film formation as will be particularly described in examples and comparative examples.

The present invention is more particularly described by way of examples. Comparative examples are also described.

EXAMPLE 1

5.4 g of ferric sulfate was dissolved in 100 g of water for use as an oxidant containing transition metal ions thereby obtaining an aqueous oxidant solution.

Separately, an aqueous solution containing 5 g of pyrrole monomer, 2.9 g of an aqueous solution of 40% sodium alkylsulfonate having an average molecular weight of 328 g and 100 g of water was prepared. This aqueous solution was added to the oxidant solution, followed by polymerization under conditions of room temperature and an ambient pressure under agitation.

The sodium alkylsulfonate used was a mixture of sodium alkylsulfonates whose alkyl moieties had, respectively, from 11 to 17 carbon atoms.

The resultant precipitate was separated by filtration and washed with water until the filtrate was neutral, followed by further washing with water. Thereafter, the precipitate was dried at about 50° C. for several hours under reduced pressure to obtain a solid conductive composition comprising conjugated double bond-bearing polypyrrole doped with the sulfate and the alkylsulfonate.

The yield of the conductive composition was weighed, after which part of the composition was milled in a mortar and placed in a mold, followed by compression at a pressure of about 30 MP., to obtain a disk-shaped pellet for use in measurement of electric conductivity.

The electric conductivity was measured using a resistivity measuring instrument, Loresta SP, MCP-T400, made by Mitsubishi Petrochemical Co., Ltd.

The measurements of yield and the electric conductivity are shown in Table 1.

The yield and electric conductivity of the polypyrrole composition which were obtained by varying the concentration of the sodium alkylsulfonate in the reaction system are shown in FIG. 1. From the figure, it will be seen that the electric conductivity is high when the inorganic and organic anions coexist. Where the small-size inorganic ions alone are doped, the polypyrrole skeletal structure suffers distortion, making small electric conductivity small. On the other hand, with the organic ions having a greater molecule size, the main chain of the polypyrrole is not distorted but the distance between the polymer chains becomes so great that the conductivity tends to be reduced through hopping therebetween. Accordingly, when inorganic and organic ions exist in the polymer composition, a maximum electric conductivity is obtained. If the anions of the surface active agent are present in the composition in amounts exceeding a maximum doping concentration, such anions are adsorbed on the surfaces of the polypyrrole, thereby forming a kind of insulating layer thereby impeding the characteristic properties of the composition including the electric conductivity. The content of the organic anions should preferably be 3 to 25 mole % per unit ring.

The polypyrrole composition was subjected to elementary analysis, revealing that the ratio between the sulfur element and the nitrogen element increases as the content of sodium alkylsulfonate increases.

On the other hand, the content of iron was found to be very low at a level of a trace. From this, the reason why the yield increases is considered as follows: the alkylsulfonate is not incorporated as a part of the polymer in the form of an iron salt, but the alkylsulfonate anion is incorporated in place of the divalent sulfate ions depending on the concentration in the reaction system. However, full substitution of the sulfate ions with the alkylsulfonate results is a lowering of the electric conductivity.

Moreover, when using ferric chloride in place of the ferric sulfate, it was found that the alkylsulfonate anion was incorporated by substitution with the monovalent chlorine ions although the degree of substitution depended on the concentration of the sodium alkylsulfonate in the reaction system.

TABLE 1

| Example | Yield (g) | Electric Conductivity (S/cm) | Comparative Example | Yield (g) | Electric Conductivity (S/cm) |
| --- | --- | --- | --- | --- | --- |
| 1 | 1.12 | 26.5 | 1 | 0.31 | 2.34 |
| 2(a) | 1.06 | 14.3 | 2 | 0.68 | 4.42 |
| (b) | 0.94 | 17.1 | | | |
| (c) | 1.14 | 15.7 | | | |
| (d) | 1.02 | 12.4 | | | |
| (e) | 0.75 | 13.2 | | | |
| (f) | 1.38 | 24.8 | | | |
| 3 | 2.13 | 50.0 | 3 | 0.64 | 0.0029 |
| 4(a) | 2.17 | 17.0 | | | |
| (b) | 1.51 | 22.1 | | | |
| (c) | 1.84 | 17.2 | | | |
| (d) | 1.80 | 15.4 | | | |
| (e) | 1.27 | 16.8 | | | |
| (f) | 2.17 | 30.6 | | | |
| 5 | 1.17 | 0.37 | 4 | 0.50 | 0.16 |
| 6 | 0.84 | 0.12 | 5 | 0.67 | 0.0062 |
| 7 | 1.42 | 0.25 | 6 | 0.91 | 0.14 |

COMPARATIVE EXAMPLE 1

The general procedure of Example 1 was repeated except that the monomer solution did not contain any alkylsulfonate, thereby obtaining a polypyrrole composition. This composition was subjected to measurement of yield and electric conductivity. The results are shown in Table 1. The comparison between the results of Example 1 and Comparative Example 1 reveals that the composition of the Example is much better than that of Comparative Example 1.

From this, the composite dopant contained in the polymer composition of the invention is better than the inorganic dopant alone.

EXAMPLE 2

The general procedure of Example 1 was repeated using, in place of sodium alkylsulfonate, (a) 2.2 g of an aqueous solution of 40% sodium 2-ethylhexylsulfate, (b) 5.7 g of an aqueous solution of 30% sodium polyethylene oxide alkylsulfate having three ethylene oxide recurring units with mixed alkyl moieties having from 11 to 15 carbon atoms, (c) 0.91 g of an aqueous dispersion paste of 70% potassium 2-ethylhexylphosphate, (d) 4.0 g of an aqueous dispersion of 70% potassium polyethylene oxide alkylphosphate having five ethylene oxide recurring units with alkyl moieties having 12 and 13 carbon atoms, (e) 1.6 g of an aqueous dispersion paste of 60% soap of coconut oil fatty acid and potassium, (f) 3.3 g of an alcohol-added aqueous solution of 40% sodium triisopropylnaphthalenesulfonate, and (g) 1.0 g of sodium naphthalenesulfonate, thereby obtaining conductive compositions. Each composition was subjected to measurements of yield and electric conductivity.

The results are shown in Table 1. The comparison between the results of Example 2 and Comparative Example 1 reveals that the conductive compositions of Example 2 are better than that of Comparative Example 1.

EXAMPLE 3

The general procedure of Example 1 was repeated using, in place of the oxidant solution of 5.4 g of ferric sulfate in 100 g of water, an oxidant solution of 5.4 g of ferric sulfate and 2.3 g of ammonium persulfate in 100 g of water, thereby obtaining a conductive composition. The composition was subjected to measurements of yield and electric conductivity. The results are shown in Table 1.

COMPARATIVE EXAMPLE 2

The general procedure of Example 3 was repeated without use of any sodium alkylsulfonate, thereby obtaining polypyrrole. This polymer was subjected to measurements of yield and electric conductivity. The results are shown in Table 1.

COMPARATIVE EXAMPLE 3

The general procedure of Example 3 was repeated using an oxidant solution of 2.3 g of ammonium persulfate in 100 g of water in place of the oxidant solution of 5.4 g of ferric sulfate and 2.3 g of ammonium persulfate, thereby obtaining a conductive composition. The composition was subjected to measurements of yield and electric conductivity. The results are shown in Table 1.

The comparison between the results of Example 3 and the results of Comparative Examples 2, 3 reveals that the composition of the invention is better than those of Comparative Examples 2, 3. It should be noted that the electric conductivity of Comparative Example 2 is so high as in Example 2(a) or 2(d), but thermal and humidity resistances are much inferior to those of Examples of the invention.

EXAMPLE 4

The general procedure of Example 3 was repeated using, in place of sodium alkylsulfonate, (a) 2.2 g of an aqueous solution of 40% sodium 2-ethylhexylsulfate, (b) 5.7 g of an aqueous solution of 30% sodium polyethylene oxide alkylsulfate having three ethylene oxide recurring units with mixed alkyl moieties having from 11 to 15 carbon atoms, (c) 0.91 g of an aqueous dispersion paste of 70% potassium 2-ethylhexylphosphate, (d), 4.0 g of an aqueous dispersion of 70% potassium polyethylene oxide alkylphosphate having five ethylene oxide recurring units with mixed alkyl moieties having 12 and 13 carbon atoms, (e) 1.6 g of an aqueous dispersion paste of 60% soap of coconut oil fatty acid and potassium, and (f) 3.3 g of an alcohol-added aqueous solution of 40% sodium triisopropylnaphthalenesulfonate, thereby obtaining conductive compositions. Each composition was subjected to measurements of yield and electric conductivity. The results are shown in Table 1.

EXAMPLE 5

The general procedure of Example 1 was repeated using 2.5 g of cupric sulfate in place of 5.4 g of ferric sulfate, thereby obtaining a conductive composition. The composition was subjected to measurements of yield and electric conductivity, with the results shown in Table 1.

COMPARATIVE EXAMPLE 4

The general procedure of Example 5 was repeated without use of any sodium alkylsulfonate, thereby obtaining a conductive composition. The composition was subjected to measurements of yield and electric conductivity, with the results shown in Table 1.

The comparison between the results of Example 5 and Comparative Example 4 reveals that the composition of Example 5 is better in yield and electric conductivity than that of Comparative Example 4. It should be noted that where cupric salts are used an oxidant, the polymerization velocity becomes slower than in the case using ferric salts along with lower electric conductivity.

EXAMPLE 6

An oxidant solution was obtained by dissolving 5.4 g of ferric sulfate and 3 g of sulfiric acid in 100 g of water. The sulfuric acid was used as a pH adjuster.

A solution of 7 g of aniline monomer and 2.9 g of an aqueous solution of 40% sodium alkylsulfonate as used in Example 1 in 100 g of water was separately prepared, followed by addition to the oxidant solution to polymerize the monomer for 30 minutes in the same manner as in Example 1, thereby obtaining a conductive polyaniline composition. The composition was subjected to measurements of yield and electric conductivity. The results are shown in Table 1.

COMPARATIVE EXAMPLE 5

The general procedure of Example 6 was repeated without addition of any sodium alkylsulfonate. The resultant composition was subjected to measurements of yield and electric conductivity, with the results shown in Table 1.

EXAMPLE 7

The general procedure of Example 6 was repeated using an oxidant solution of 5.4 g of ferric sulfate, 2.3 g of ammonium persulfate and 3 g of sulfuric acid in 100 g of water in place of the oxidant solution of 5.4 g of ferric sulfate and 3 g of sulfuric acid in 100 g of water, thereby obtaining a conductive polyaniline composition. The composition was subjected to measurements of yield and electric conductivity. The results are shown in Table 1.

COMPARATIVE EXAMPLE 6

The general procedure of Example 6 was repeated without use of any sodium alkylsulfonate, thereby obtaining a conductive polyaniline composition. The composition was subjected to measurements of yield and electric conductivity. The results are shown in Table 1.

Now, the effect of fine particles of oxides on the film formation are particularly described in the following examples.

EXAMPLE 8

A dispersion of 5 g of pyrrole monomer, 2.9 g of an aqueous solution of 40% sodium alkylsulfonate as used in Example 1 and 1 g of silica fine particles having an average particle size of not greater than about 100 nm (Aerosil 300 commercially available from Nippon Aerosil Corp.) in 100 g of water was prepared. Separately, 5.4 g of ferric sulfate was dissolved in 100 g of water to obtain an oxidant solution.

A stainless steel block having a size of 1.4×0.9×2.0 mm which had been roughened on the surfaces thereof by means of 400 mesh-size corundum particles was alternately immersed in the dispersion and then in the oxidant solution each for 10 minutes, thereby depositing a conductive composition on the surfaces thereof.

The above immersion cycle was repeated until the stainless steel block was fully covered with the conductive composition. The immersion cycles for the complete coverage were counted. The results are shown in Table 2. It will be noted that the yield and electric conductivity of the conductive composition of this example are similar to those of Example 1.

TABLE 2

| Example | Immersion Cycles | Reference | Immersion Cycles |
| --- | --- | --- | --- |
| 8 | 8 | 1 | 15 |
| 9(a) | 8 | 2(a) | 17 |
| (b) | 7 | (b) | 18 |
| (c) | 8 | (c) | 16 |
| (d) | 9 | (d) | 16 |
| (e) | 7 | (e) | 16 |
| (f) | 8 | (f) | 18 |
| 10 | 7 | 3 | 13 |
| 11(a) | 7 | 4(a) | 13 |
| (b) | 6 | (b) | 12 |
| (c) | 7 | (c) | 14 |
| (d) | 7 | (d) | 14 |
| (e) | 6 | (e) | 13 |
| (f) | 7 | (f) | 12 |
| 12 | 11 | 5 | 18 |
| 13 | 8 | 6 | 16 |
| 14 | 10 | | |

Reference 1

The general procedure of Example 8 was repeated without addition of any silica fine powder to the monomer dispersion to determine the number of repetitions of the immersion cycle. The results are shown in Table 2.

As will be apparent from the results of Example 8 and Reference 1, the addition of the silica fine particles is effective in expediting the coverage of the stainless steel. This is considered for the reason that the silica fine powder contributes to film formation of the pyrrole polymer. More particularly, in a system where fine particles of oxides such as silica or alumina are dispersed, the particles tend to be self-aligned, so that they can be deposited on a solid surface very thinly.

EXAMPLE 9

The general procedure of Example 8 was repeated using, in place of 2.9 g of the aqueous solution of 40% sodium alkylsulfonate, (a) 2.2 g of an aqueous solution of 40% sodium 2-ethylhexylsulfate, (b) 5.7 g of an aqueous solution of 30% sodium polyethylene oxide alkylsulfate having three ethylene oxide recurring units, (c) 0.91 g of an aqueous dispersion paste of 70% potassium 2-ethylhexylphosphate, (d) 4.0 g of an aqueous dispersion of 70% potassium polyethylene oxide alkylphosphate, (e) 1.6 g of an aqueous dispersion paste of 60% soap of coconut oil fatty acid and potassium, and (f) 3.3 g of an alcohol-added aqueous solution of 40% sodium triisopropylnaphthalenesulfonate, thereby obtaining conductive compositions. Each composition was subjected to the coverage test. It will be noted that the yield and electric conductivity are similar to those of Example 2. The results are shown in Table 2.

Reference 2

The general procedure of Example 9 was repeated without use of any fine particles of an oxide. The results are shown in Table 2.

The comparison between the results of Example 9 and Reference 2 reveals that when the compositions of the invention are used to cover the stainless steel, the addition of the oxide fine particles is effective in reducing the immersion cycles required for the coverage.

EXAMPLE 10

The general procedure of Example 8 was repeated using an oxidant solution of 5.4 g of ferric sulfate and 2.3 g of ammonium persulfate in 100 g of water in place of the oxidant solution of 5.4 g of ferric sulfate in 100 g of water to conduct the coverage test.

The results on the immersion cycles are shown in Table 2.

Reference 3

The general procedure of Example 10 was repeated without addition of the silica fine particles. The results on the immersion cycles are shown in Table 2.

The comparison between the results of Example 10 and Reference 3 reveals that the addition of the oxide fine particles is effective in reducing the immersion cycles required for the coverage.

EXAMPLE 11

The general procedure of Example 10 was repeated using, in place of 2.9 g of the aqueous solution of 40% sodium alkylsulfonate, (a) 2.2 g of an aqueous solution of 40% sodium 2-ethylhexylsulfate, (b) 5.7 g of an aqueous solution of 30% sodium polyethylene oxide alkylsulfate having three ethylene oxide recurring units, (c) 0.91 g of an aqueous dispersion paste of 70% potassium 2-ethylhexylphosphate, (d) 4.0 g of an aqueous dispersion of 70% potassium polyethylene oxide alkylphosphate, (e) 1.6 g of an aqueous dispersion paste of 60% soap of coconut oil fatty acid and potassium, and (f) 3.3 g of an alcohol-added aqueous solution of 40% sodium triisopropylnaphthalenesulfonate, thereby obtaining conductive compositions. Each composition was subjected to the coverage test. It will be noted that the yield and electric conductivity of these compositions are similar to those of Example 4. The results are shown in Table 2.

Reference 4

The general procedure of Example 10 was repeated without use of any silica fine particles, thereby conducting the coverage test. The comparison between the results of Example 11 and Reference 4 reveals that the addition of the oxide fine particles is effective in reducing the immersion cycles required for the full coverage.

EXAMPLE 12

A dispersion of 7 g of aniline monomer, 2.9 g of an aqueous solution of 40% sodium alkylsulfonate as used in Example 1 and silica fine particles in 100 g of water was prepared. Separately, 5.4 g of ferric sulfate and 3 g of sulfuric acid was dissolved in 100 g of water to obtain an oxidant solution.

Then, the general procedure of Example 8 was repeated for the coverage test. The results are shown in Table 2. It will be noted that the yield and electric conductivity of this example are similar to those of Example 6.

Reference 5

The general procedure of Example 12 was repeated without addition of any silica fine particles, thereby conducting the coverage test. The results on the immersion cycles are shown in Table 2.

The comparison between the results of Example 12 and Reference 5 reveals that the addition of the oxide fine particles is effective in reducing the immersion cycles required for the full coverage.

EXAMPLE 13

The general procedure of Example 12 was repeated using an oxidant solution of 5.4 g of ferric sulfate and 2.3 g of ammonium persulfate in 100 g of water in place of the oxidant solution of 5.4 g of ferric sulfate and 3 g of sulfuric acid in 100 g of water, thereby conducting the coverage test. The results are shown in Table 2. It will be noted that the yield and electric conductivity of this example are similar to those of Example 7.

Reference 6

The general procedure of Example 13 was repeated without addition of any silica fine particles, thereby conducting the coverage test. The results on the immersion cycles are shown in Table 2.

The comparison between the results of Example 13 and Reference 6 reveals that the addition of the oxide fine particles is effective in reducing the immersion cycles required for the full coverage.

EXAMPLE 14

The general procedure of Example 8 was repeated using 1 g of alumina sol 100 (commercially available from Nissan Chemical Industries, Ltd.) in place of the silica fine particles, thereby conducting the coverage test. The results on the immersion cycles are shown in Table 2. The comparison between the results of Example 14 and Reference 1 reveals that the addition of the oxide fine particles is effective in reducing the immersion cycles required for the fill coverage.

EXAMPLE 15

The general procedure of Example 2 was repeated for different polymerization times without use of any surface active agent and also using two types of anionic surface active agents including sodium triisopropylnaphthalenesulfonate and sodium dodecylbenenesulfonate, and a nonionic surface active agent of sodium 2-naphthalenesulfonate.

Figure 2:
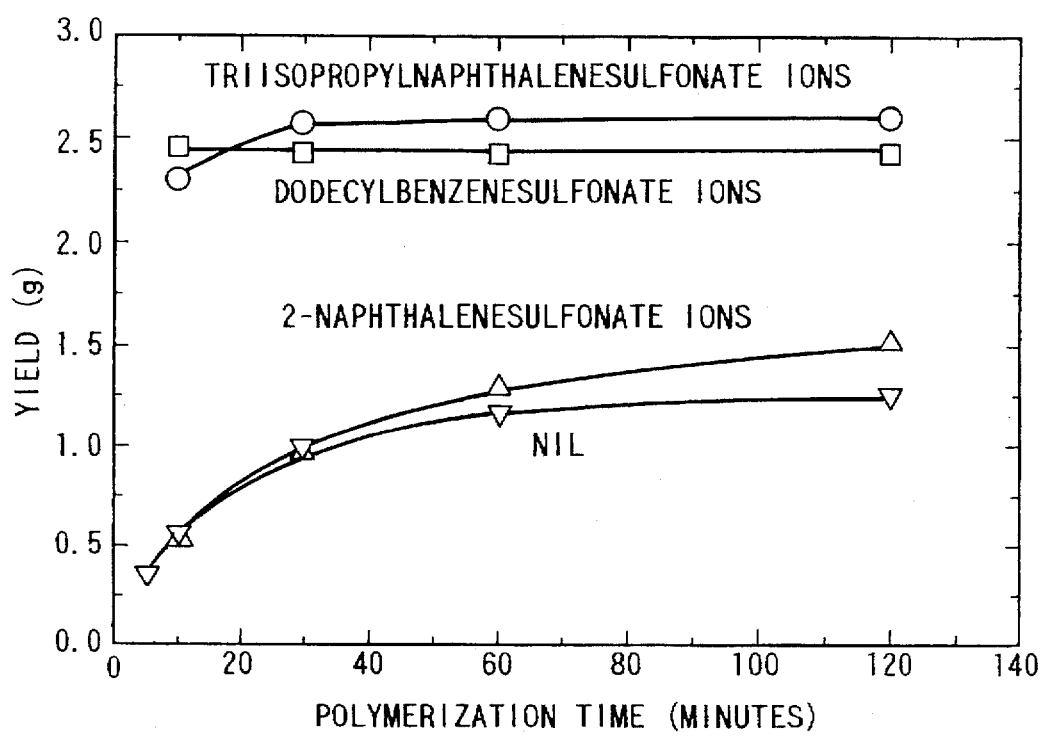
FIG. 2 is a graph showing the relationship between the yield and the polymerization time for different types of surface active agents or without use of any surface active agent.

The relationship between the yield and the polymerization time for different types of surface active agents is shown in FIG. 2.

From the figure, it will be seen that the anionic surface active agents are remarkably better in the yield than the nonionic surface active agent and in the case where no surface active agent. In addition, the polymerization reaction is completed within a very short time. The reason for this is considered as follows. When polyvalent metal ions are used as an oxidant and coexisting organic anions are those derived from substances having a hydrophobic group and serving as an anionic surface active agent, an insolubilized matter or salt is at least transiently formed during the reaction. The insoluble metal salt of the organic anion acts as an initiation site for the polymerization reaction. Thus, the polymerization velocity increases.

EXAMPLE 16

Figure 3:
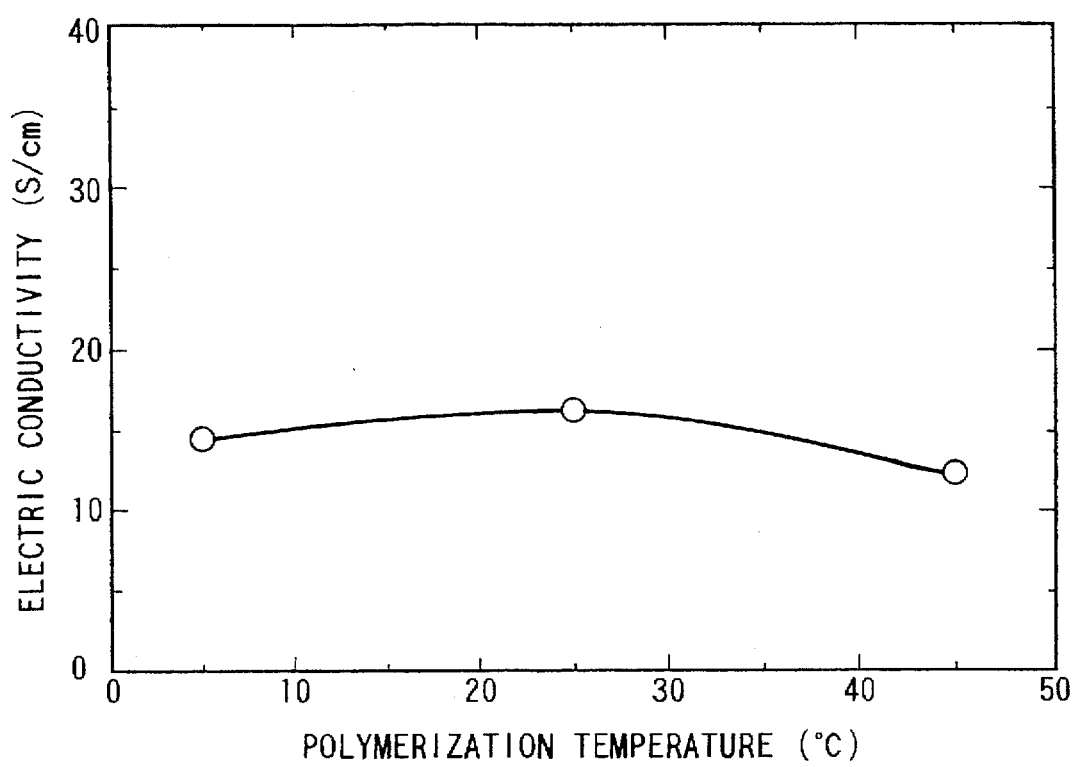
FIG. 3 is a graph showing the relationship between the electric conductivity and the polymerization temperature used.

The general procedure of Example 2(f) was repeated, i.e. using sodium triisopropylnaphthalenesulfonate, at different polymerization temperatures. The electric conductivity of the resultant polypyrrole compositions obtained at different temperatures was measured. The results are shown in FIG. 3.

From the figure, it will be seen that the dependency of the electric conductivity on the polymerization temperature is very small. This is considered for the reason that the polymerizable monomer is adsorbed on the surfaces of the insoluble salt as having set out in Example 15, thereby forming a thin adsorption layer on the surfaces. The polymerization reaction proceeds or initiates at the thin adsorption layer.

What is claimed is:

1. A conductive polymer composition which comprises polypyrrole, and a composite dopant consisting essentially of an organic anion derived from an anionic surface active agent and a polyvalent inorganic anion derived from a transition metal salt.

2. A conductive polymer composition according to claim 1, wherein said organic anion is present in an amount of 3 to 25 mole % per monomer unit of said polypyrrole.

3. A conductive polymer composition according to claim 1, wherein said organic anion is a member selected from the group consisting of carboxylates, organic sulfonates, esterified sulfates, and esterified phosphates.

4. A conductive polymer composition according to claim 1, wherein said polyvalent inorganic anion is present in an amount of 3 to 25 mole % per monomer unit of said polypyrrole.

5. A conductive polymer composition according to claim 1, further comprising 0.1 to 5 wt %, based on the polymer composition, of fine particles of an oxide.

6. A conductive polymer composition according to claim 5, wherein said fine particles have a size of not larger than 100 nm.

7. A conductive polymer composition according to claim 5, wherein said fine particles are made of silica, alumina or lithium silicate.

8. A conductive polymer composition according to claim 1, wherein said polyvalent inorganic anion consists of sulfate.

9. A conductive polymer composition according to claim 1, wherein said polyvalent inorganic anion consists of a mixture of sulfate and persulfate.

* * * * *